Aug. 10, 1954   E. E. LAKSO   2,685,767
MANUFACTURE OF PLASTIC AMPOULES
Filed Dec. 17, 1949   8 Sheets-Sheet 1

INVENTOR.
Eino E. Lakso
BY
Charles R. Fay, atty.

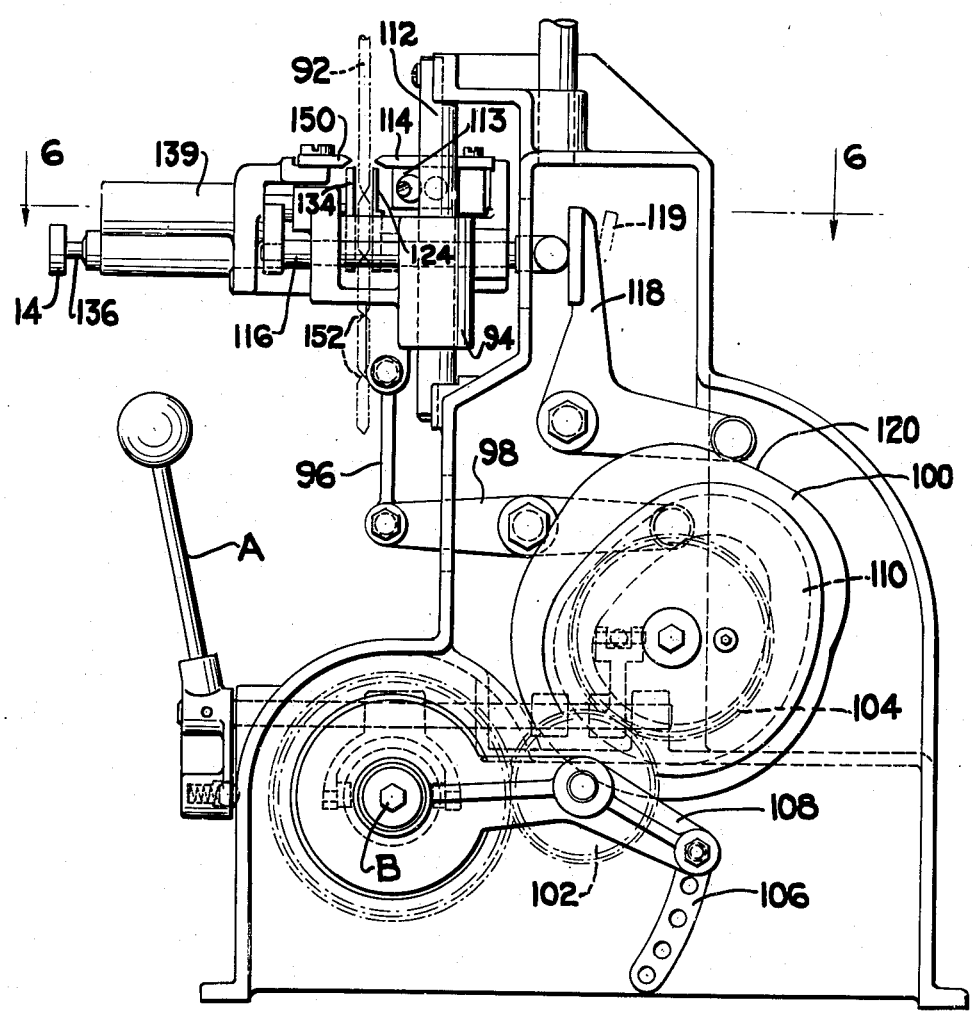

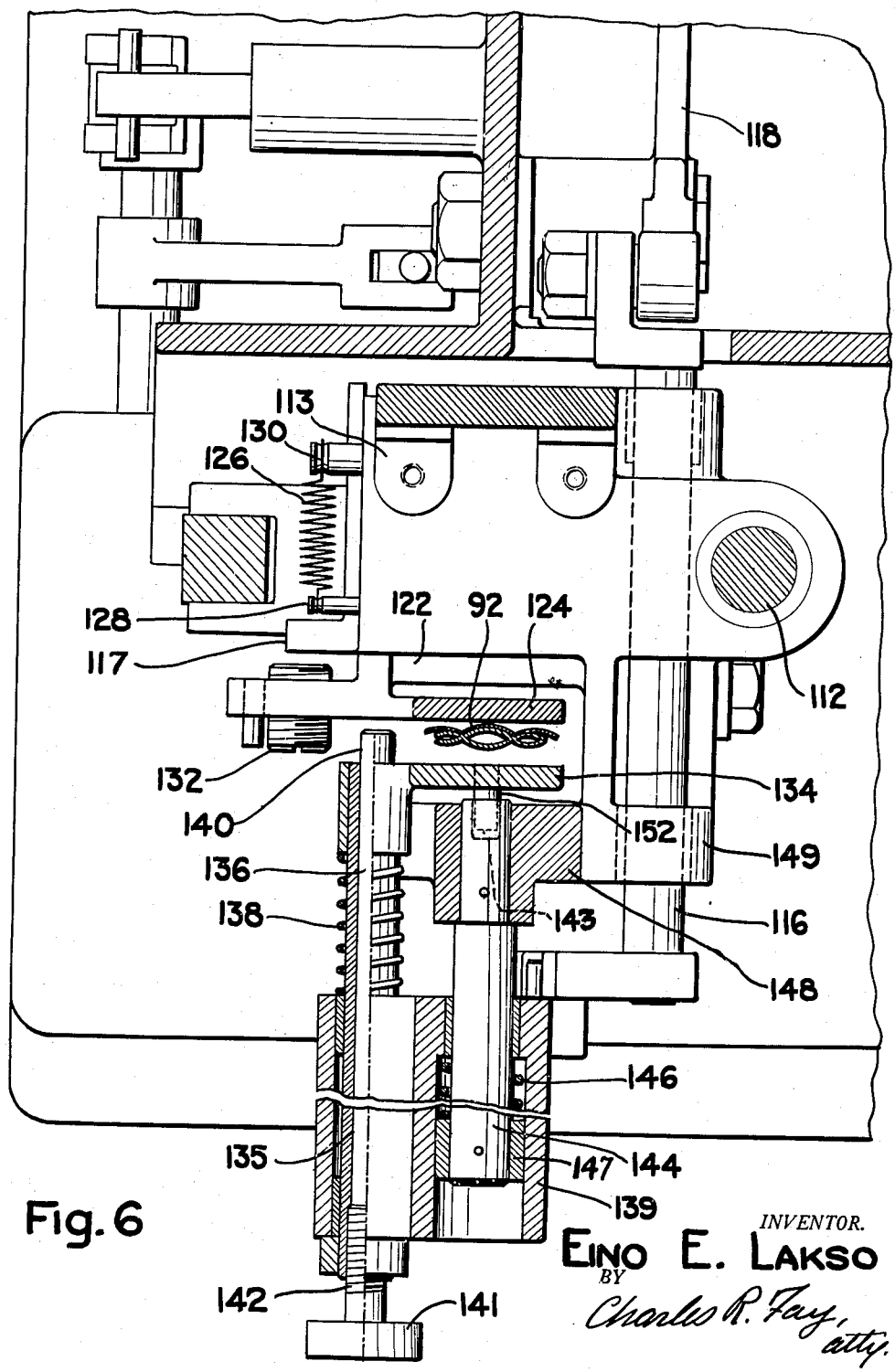

Aug. 10, 1954  E. E. LAKSO  2,685,767
MANUFACTURE OF PLASTIC AMPOULES
Filed Dec. 17, 1949  8 Sheets-Sheet 7

INVENTOR.
EINO E. LAKSO

Aug. 10, 1954　　　E. E. LAKSO　　　2,685,767
MANUFACTURE OF PLASTIC AMPOULES
Filed Dec. 17, 1949　　　　　　　　　　　　　　　8 Sheets-Sheet 8

INVENTOR.
Eino E. Lakso
BY
Charles R. Fay,
atty.

Patented Aug. 10, 1954

2,685,767

UNITED STATES PATENT OFFICE 2,685,767

MANUFACTURE OF PLASTIC AMPOULES

Eino E. Lakso, Fitchburg, Mass., assignor to Sterling Drug Inc., New York, N. Y., a corporation of Delaware Application December 17, 1949, Serial No. 133,531

14 Claims. (Cl. 53—33)

This invention relates to a new and improved apparatus for the rapid and accurate forming and filling of plastic ampoules and the like containers, and the principal object of the invention resides in the provision of a machine for making and completely filling sanitary plastic ampoules, etc. with extreme accuracy and at high speed to the end that the ampoules are void of air and may be used in any way desired but particularly for medicinal purposes, including the provision of ampoules for storing materials to be injected hypodermically; and the provision of a high speed automatic continuous machine forming and filling the plastic ampoules with a minimum of attention or skill required on the part of the operator.

A further object of the invention resides in the provision of a machine as above described including a storage reel or the like for plastic tubular materials which may have been produced by any desired method, as by extrusion, said tube preferably being very thin and flexible and made of plastic material in the nature of polyethylene or the like films having heat sealing qualities, preferably but not necessarily, in combination with means for applying a covering material to prevent sticking of the said tube when it is to be heat sealed, and means forming a guide received in the tube as the same moves along, so that the tube is substantially taut, said guide embodying a notched portion which receives a sharp knife blade to slit the taut tube at an edge as it progresses over the guide, the latter embodying a filling device or nozzle extending in through the slit and downwardly of the progressing slit tube to fill the same continuously or in needed quantities, further in combination with means to reseal the slit in the tube.

Another object of the invention resides in the provision of means for accurately measuring or controlling the amount of material to be contained in each ampoule, and immediately subsequently cross-sealing the tube, said means comprising a head having a fixed heated cross-sealing knife and a movable cooperating cross-sealing knife arranged to move relatively toward and from each other to accomplish the cross sealing function immediately subsequently to the relative movement toward each other of a pair of volume controlling fingers or plates which may be adjusted so as to eventually come to rest at a predetermined distance from each other, the filled resealed tube being located between said fingers and being deformed or slightly squeezed therebetween to expel any surplus material therein upwardly in the tube, so that when the cross sealing takes place, the ampoule is very accurately filled, and any air is avoided therein.

A still further object of the invention resides in the volume control and cross sealing closing means above described contained as a unit on a head provided with means to reciprocate the same in timed relation with the progress of the filled tube, the head moving in the direction of the tube during the interval of cross-sealing and volume control and moving in the opposite direction at an interval in the cycle when the cross-sealing tools are retracted, whereby the progress of the tube may be continuous and thus more rapid resulting in higher production even though the accuracy of the volume control is maintained.

Other objects of the invention include the provision of safety devices particularly including an automatic shutoff for the filler tube, controlled by the width of the filled tube so that in the event the tube being filled "starves," the filling tube will be completely shut off and a series of incorrectly or unfilled ampoules will be avoided automatically.

Other objects and advantages of the invention will appear hereinafter.

Reference is to be had to the accompanying drawings, in which

Fig. 5 is a side view of the lower or cross sealing and volumetric control assembly;

Fig. 6 is a section taken on line 6—6 of Fig. 5;

Fig. 7 is an enlarged view showing the slit resealing operation;

Figure 1:
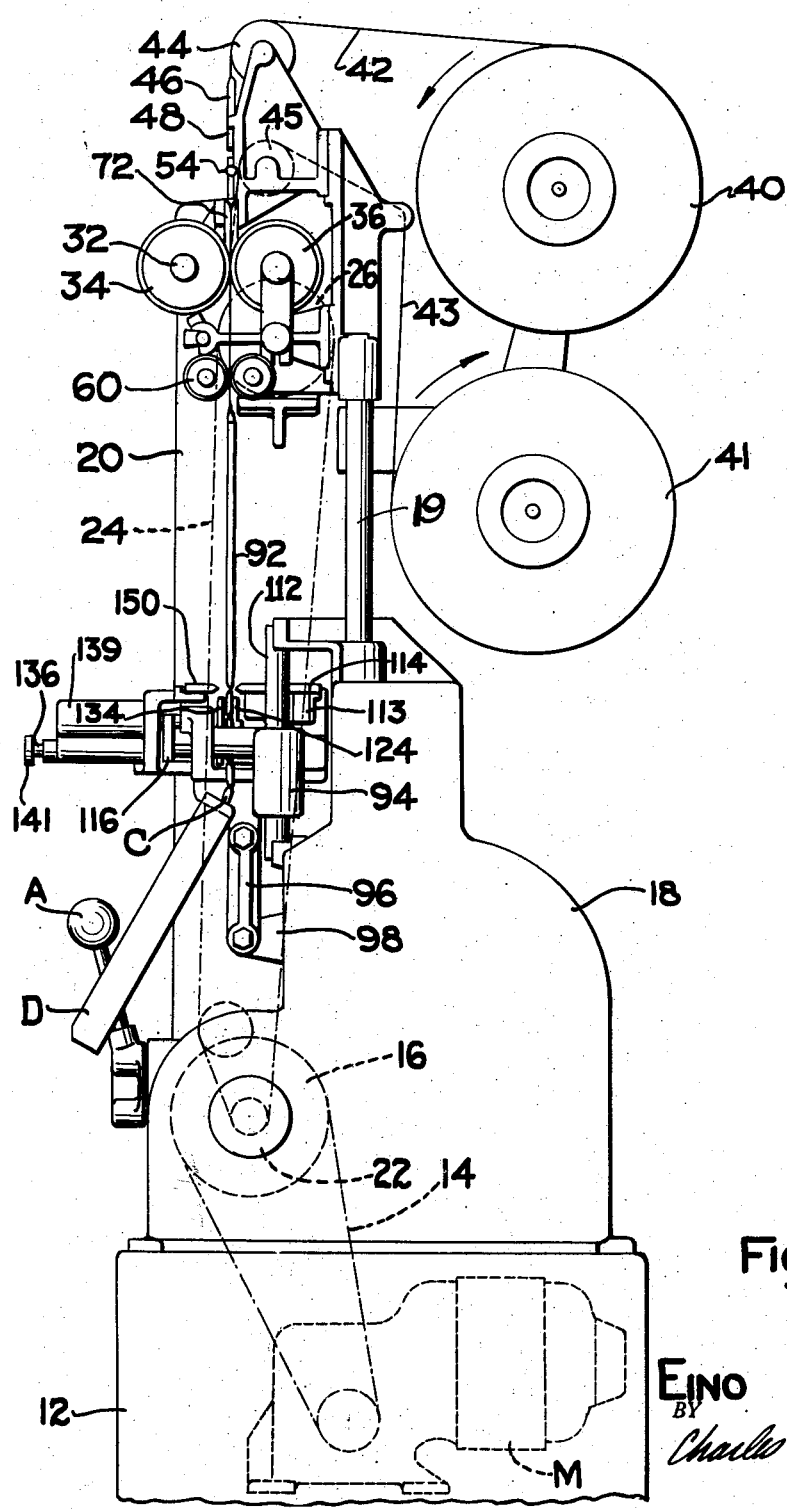
Fig. 1 is a view in side elevation of a machine according to the invention.
Figure 2:
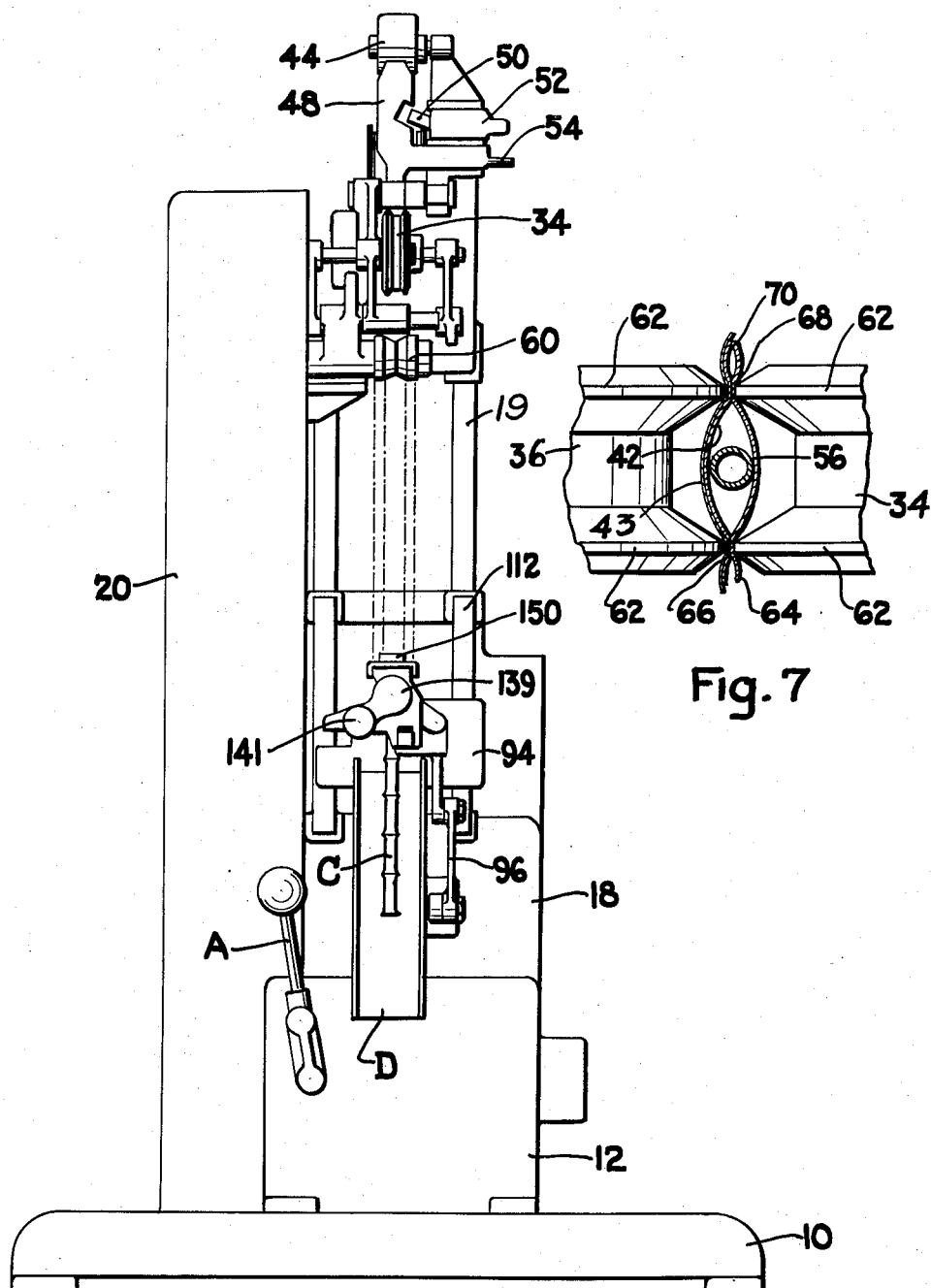
Fig. 2 is a view in front elevation thereof.

Referring now to Figs. 1 and 2, these figures show the machine in general and illustrate the entire mechanism comprising the base 10 on which is mounted a casing 12 containing a motor M, driving by means of a belt or chain 14, a sprocket or pulley 16 by means of which the entire mechanism derives its motions.

Casing 12 extends upwardly mounting a support or the like 18 and a standard 19 rises upwardly from the base 19 to support the upper or tube slitting and filling mechanism. By means of a reducing gearing generally indicated at 22 and another chain or belt 24, a sprocket or pulley 26 in casing 20, is rotated and drives at a slower speed a shaft 28, see Fig. 9, by means of a gear 30 which in turn drives a shaft 32, the latter mounting a longitudinal tube sealing roller 34 cooperating with a heated tube sealing roller 36 having a heating element generally indicated at 38.

A reel indicated at 40 carries a supply of a thin plastic film tube which may be made by extrusion or any other means not pertinent to the present invention. This tube is shown at 42 being drawn from reel 40 and over a roller 44 to a point 46 indicated in Fig. 1 where it passes over a guide plate indicated at 48, see Fig. 4. The guide plate 48 is flat and is received in the tube and maintains the same in taut condition so it is slightly stretched, thereby being easily slit at an edge thereof by a knife blade 50 in a block 52 mounted on an angle to the longitudinal axis of the tube and to its direction of forward movement. This action provides a continuously moving plastic tube having a slit edge. Another reel 41 feeds a strip 43 of non-sticking material over roller 45 to lay in against the side of the tube to be resealed by heated means.

The guide 48 is mounted in a convenient manner on the standard 19 and embodies a pipe or the like having an entrance end at 54, said pipe continuing to an elbow 56 and downwardly inside the slit tube to a considerable extent terminating at a point indicated at 58 in Figs. 3 and 4 just below the nip of a pair of driven tube traveling rollers 60 which are V-shaped and tend to maintain the tube, now receiving fluid from pipe 56, in a rounded form insofar as the cross section thereof is concerned.

The edge or slit sealing rollers 34 and 36 are located below the entrance point for the pipe 56 to reseal the tube after the slit provides for the reception of the filling pipe; and as best seen in Fig. 7 the rollers 34 and 36 are provided with relatively dull double circular knife edges 62 which cooperate to reseal the tube in multiple fashion. The slit is indicated at 64 and the same is resealed at 66. The other sealing knife edges 62 form the opposite edge seal at 68 and this shown to emphasize the fact that the tube 42 may be sealed longitudinally in multiple fashion to provide a series of ampoules, all being formed, filled and completed simultaneously. The edge 70, of course, was not slit, and if a single tube is being filled, the seal 68 is not particularly necessary but, of course, it is to be understood that the tube 42 may be longitudinally sealed by as many edges 62 as may be found practicable.

Figure 3:
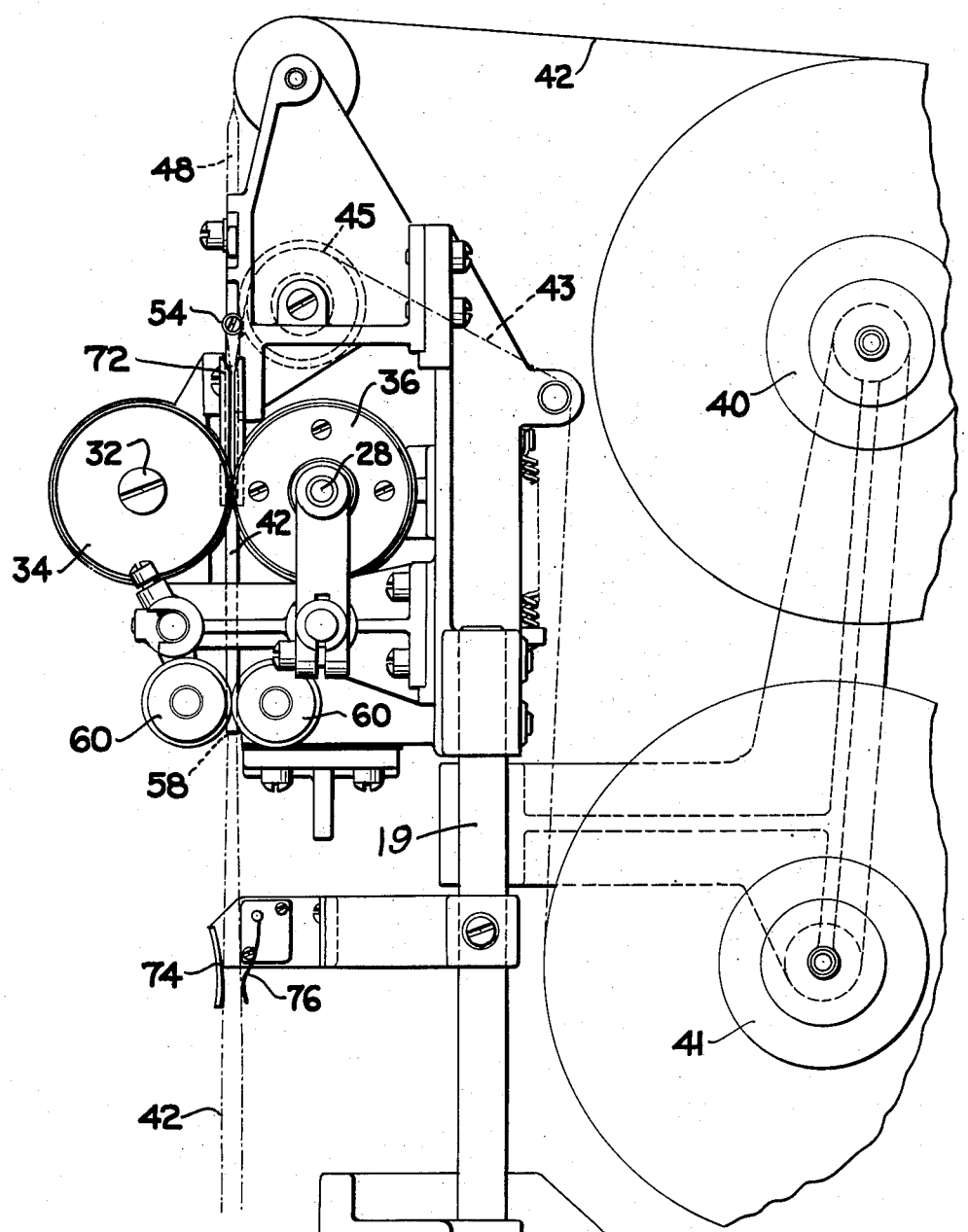
Fig. 3 is an enlarged view of the upper assembly of the machine in side elevation, and including the slitting, filling, and resealing mechanism.
Figure 4:
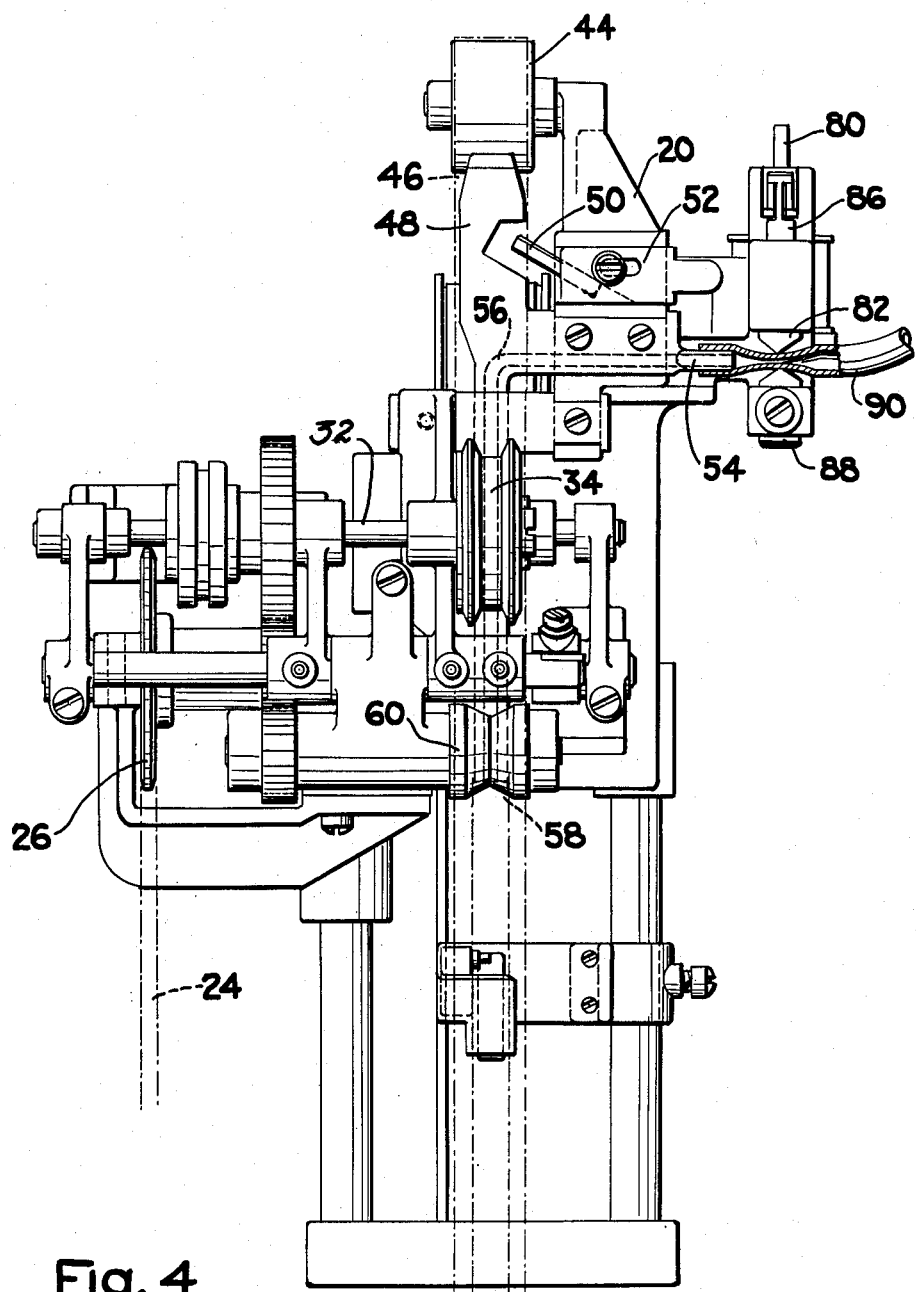
Fig. 4 is a front view of the apparatus shown in Fig. 3.

A pair of guides indicated at 72 in Fig. 3 hold the slit edges 64 and guide them to the proper position relative to the sealing rollers 34, and 36. It will also be appreciated that the filling tube 56 extends down through the nip of the sealing rolls 34, 36 as clearly shown in Fig. 7, thus helping rollers 60 in forming the tube into an oval cross sectional shape.

Figures 8, 9:
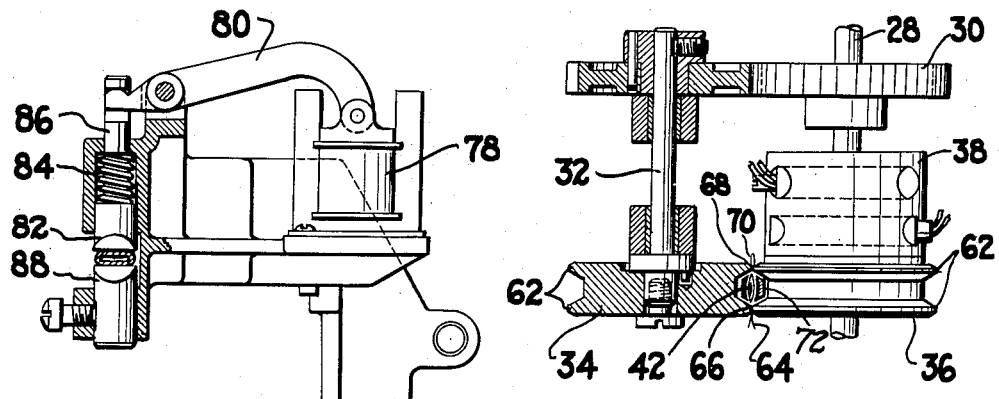
Fig. 8 is an enlarged detailed view of the shut off mechanism.
Fig. 9 is a plan view of the slit resealing means.
Figure 11:
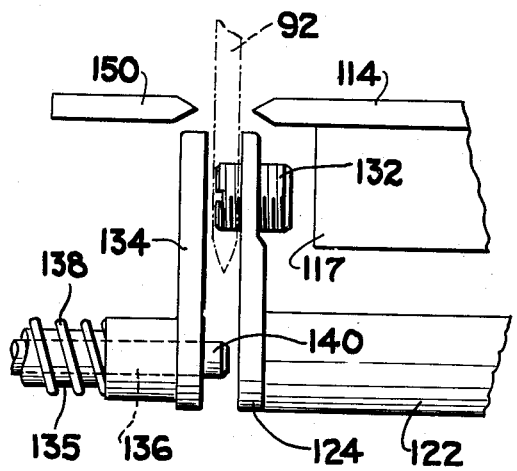
Figs. 11, 12, 13 and 14 are views illustrating the volume control and cross sealing cycle.

The tube 42 then progresses downwardly and passes through a switch arrangement 74, Fig. 3, this switch having a feeler arm 76 which is preset to maintain an electric contact closed so as to maintain a solenoid 78, Fig. 8, in such a position that a pivoted actuator arm 80 controlled thereby maintains a shut off device 82 in raised condition against the action of a spring 84. The tube 42 is, of course, substantially full of material which is induced through pipe 56, but if for any reason such material should enter in too small a quantity, the feeler finger 76 will move inwardly since it will not be held to the right in Fig. 3 by the usual fullness of the tube. This actuates the switch and provides that the solenoid 78 will operate to release plunger 86 and allow the shut off device 82 to descend in cooperation with an oppositely directed anvil 88, pinching off the filler tube 90, see Fig. 4, and stopping the possibility of the formation of under-filled ampoules.

The filled tube indicated at 92 proceeds downwardly to the cross head generally indicated at 94. This head is reciprocated vertically by means of a link 96 operated by a pivot arm 98 oscillated by a cam track 110 on a cam 100, this cam being rotated by the motor M at a controlled speed by means of reducing gears 102, 104. These gears may be varied and the gear 102 may be positioned according to the size of gear chosen by means of an apertured bar 106 receiving a yoke 108 pivotally mounting the gear 102. The effect of cam track 110 is to reciprocate head 94 in timed relation to the descent of the filled tube 92. The cross sealing is accomplished on the downward stroke of the head 94 providing an interval of time for the cross-sealing knives to remain in sealing contact with the tube, said knives being relatively retracted and raised upwardly again relatively brought inwardly to effect the succeeding cross seal, while the tube still continues to travel down.

Head 94 is vertically reciprocatorily mounted on a guide 112 and mounts a block 113 in turn carrying a heated cross-sealing knife 114. This knife is mounted in fixed relation to the head 94 but may be adjustable on the block to and from the tube when such adjustment is required. Knife 114 is electrically heated to the required degree.

A horizontal reciprocated member 116 guided in a boss 149, is controlled by an oscillating member 118 actuated by the cam track 120 of cam 100. The block 113 slidably supports an element 122 upon which is mounted a volume controlling finger or plate 124 normally urged to the left in Figs. 1, 5 and 11–14, by means of a spring 126 having one end connected to a pin 128 fixedly mounted on block 113 and connected at its other end to a pin 130 mounted on the slide 122. The finger 124 is provided with an adjustable stop 132 providing for adjustable positioning of finger 124 in its movement to the right, thus providing an extremely accurately adjusted positioning of this volume control finger.

A second and cooperating volume control finger 134 is mounted on a sleeve 135 adjustably mounted on a rod 136 and is provided with a spring 138 which normally extends finger 134 to the right in Fig. 1 with respect to a sliding member 139 which carries the sleeve and rod. The rod 136 extends outwardly of finger 134 as at 140 and the degree of this extent may be controlled by threaded adjustment of the rod in the sleeve 135 by means of threads 142 as actuated by knob 141.

The member 139 is slidably mounted on a rod 144 fixed to an abutment 148 on head 94 and surrounded by a spring 146 bearing on a head 147 and on member 139. The effect of this construction is that if member 139 be moved away from abutment 148, the spring 146 will be compressed and this spring will tend to move member 139 back toward the abutment. The block 148 contains a bore 143 receiving a pin 152 on finger or plate 134.

Figure 12:
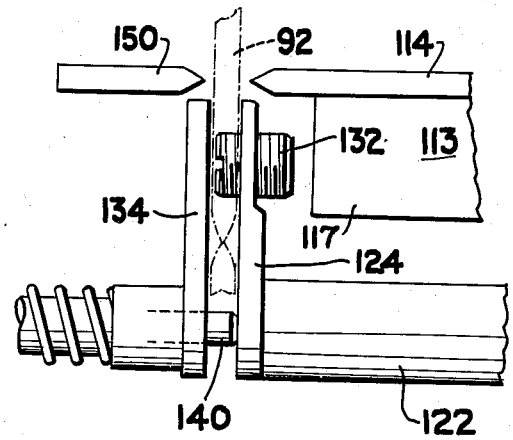
Figure 13:
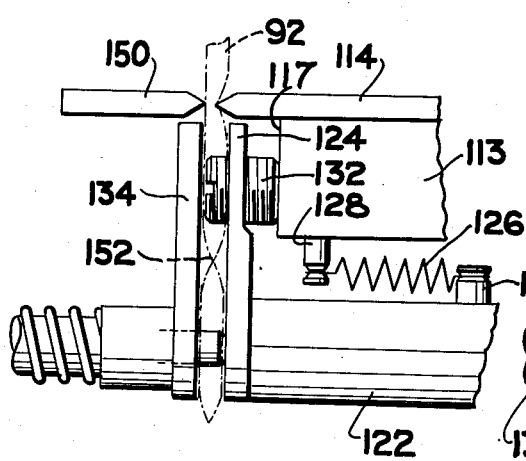
Figure 14:
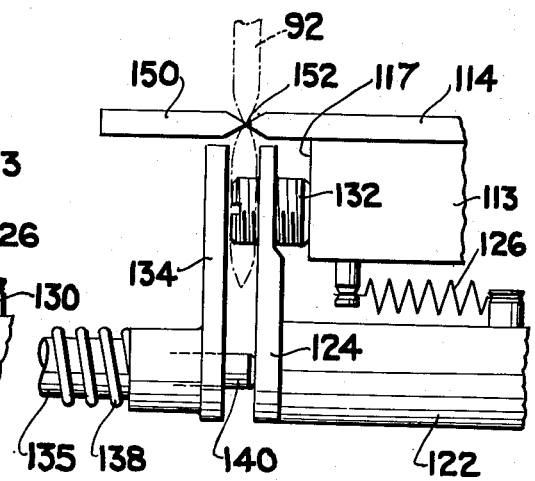

The operation of the just above described mechanism provides that member 139 is moved toward the head 94 by spring 146 in Figs. 5 and 6, as the rod 116 is relieved by the element 118 starting to the right and in the direction of the broken line position indicated at 119. The first effect of this motion is shown in Fig. 12, the parts being at rest in Fig. 11. The extending end 140 of rod 136 strikes finger 124 and pushes it to the right against the action of spring 126 which is weaker than spring 138. When stop 132 strikes the forward edge of block 113 at 117, see Fig. 13, the finger 124 is positioned, and rod 136 then holds finger 124 in this position. Also, finger or plate 134 is of course spaced the predetermined amount desired, by reason of the extent 140 of the rod 136, and the volume of the tube 92 below the knives 114 and 150 is accurately determined.

Continued movement of member 139 to the right is provided for by the then loading or compressing of spring 138 in turn lighter than spring 146 which carries the member 139 along to the right.

Member 139 continues in the right-hand direction under influence of spring 146. Member 139 is provided with a sealing knife 150 which cooperates with the heated knife 114 to form the cross seals indicated at 152, see Fig. 14. These knife blades are such that they may seal and cut off at the same time but it is preferred that they seal and make an indentation just failing to separate the ampoules so that the ampoules may be cut later or easily torn apart by the fingers.

The cycle of operation of the volume control fingers and the cross sealing knives is best illustrated in Figs. 11–14 inclusive, wherein it is plainly shown that the finger 134 has come to rest at a certain predetermined distance from finger 124, thus squeezing the ampoule to a predetermined amount prior to the coming together of the knives 114 and 150 so that any excess material within the ampoule being formed is expressed upwardly into the descending tube 92; and then the heat-sealing knives 114 and 150 perform their sealing function.

After the cross seal, the elements 118 and 116 start moving in the left-hand direction, forcing the knives apart as well as the volume control fingers, at which point the link 96 starts rising and does so sufficiently to position the head 94 relative to the tube 92 at the correct position for the succeeding volume control operation and cross sealing operation.

Figure 10:
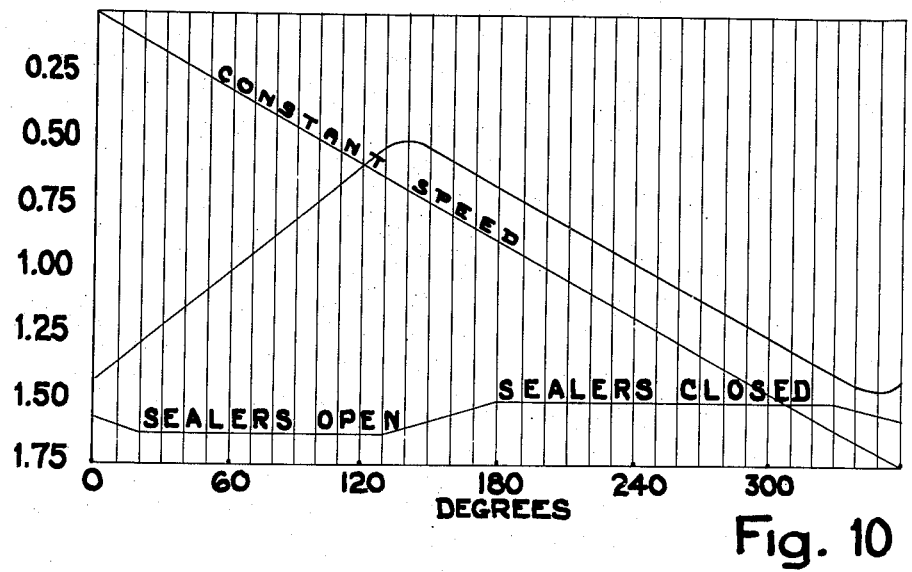
Fig. 10 is a cam timing diagram.

The diagram of Fig. 10 illustrates the constant speed of the descending tube 92, the intervals of the sealing knives being opened and closed, and the relative volume control movement by means of the fingers 124 and 134 which occurs just prior to the closing of the sealers.

A handle A may be used to control a clutch or the like for the power shaft B, and various drives, gearing, etc. are necessary to provide the proper timing and operation of the various parts, but these details are not pertinent and need not be described in great detail. The connected, completed ampoules descend in a chain C down a chute D to packaging or other machinery.

Having thus described my invention and the advantages thereof, I do not wish to be limited to the details herein disclosed, otherwise than as set forth in the claims, but what I claim is:

1. Apparatus of the class described comprising a relatively narrow, elongated guide, means to present a substantially continuous tube to the guide and causing the latter to enter the tube and the tube to pass along the guide, a knife in a generally fixed position associated with the guide and extending in general overlapping relation thereto to slit the tube continuously, a filler pipe positioned subsequent to the knife in the direction of travel of the tube and entering the slit and tube, means resealing the tube, and means cross sealing the tube at intervals.

2. The apparatus of claim 1 wherein the guide is a substantially flat plate-like element and holds the tube in substantially flat and taut condition, the knife overlapping the edge of the guide to slit the tube at the edge thereof.

3. The apparatus of claim 1 wherein the guide is a substantially flat element and has a recess at an edge thereof, the knife entering the recess.

4. Apparatus of the class described comprising tube advancing means, a relatively fixed tube slitting knife, means to guide the tube past the knife in cooperative relation thereto to slit the tube longitudinally, a pipe entering the slit and depositing material in the tube, tube resealing means, a feeler type switch engaging the filled tube and effective to be actuated upon "starving" of the tube, and a pipe shut off device controlled by the switch and effective to close the pipe upon actuation of the switch.

5. Apparatus of the class described comprising tube filling means, continuous tube advancing means, and tube cross sealing means, the last-named means comprising a pair of relatively movable sealers, means to move the sealers into and out of tube sealing relation, means moving the sealers along with the tube during the sealing operation with the sealers in sealing relation, and in the opposite direction with the sealers retracted out of sealing relation, means controlling the volume of content of the tube in the area between a preceding cross seal and the position of the subsequent cross seal, said volume-controlling means comprising a movable finger, a second movable finger, a projection on one finger to engage the other finger to space the fingers, the filled tube advancing between the fingers, means to adjust the degree of extent of the projection from said one finger, and means to move the fingers toward and away from each other.

6. Apparatus of the class described comprising tube filling means, continuous tube advancing means, and tube cross sealing means, the last-named means comprising a pair of relatively movable sealers, means moving the sealers along with the tube during the sealing operation with the sealers in sealing relation and in the opposite direction with the sealers retracted out of sealing relation, means controlling the volume of content of the tube in the area between a preceding cross seal and the position of the subsequent cross seal, said volume controlling means comprising a pair of relatively movable fingers effective to press the tube and express excess material from the tube at said area, resilient means moving the fingers to final volume controlling position and the tube into sealing engagement with one sealer, and means moving the other sealer into cooperative sealing engagement with the tube.

7. Apparatus of the class described comprising tube filling means, continuous tube advancing means, and tube cross sealing means, the last-named means comprising a pair of relatively movable sealers, means to move the sealers into and out of tube sealing relation, means moving the sealers along with the tube during the sealing operation with the sealers in sealing relation and in the opposite direction with the sealers retracted out of sealing relation, means controlling the volume of content of the tube in the area between a preceding cross seal and the position of the subsequent cross seal, said volume controlling means comprising a pair of relatively movable fingers effective to press the tube and express excess material from the tube at said area, and means to predetermine the position and spacing of said fingers at the closest point of mutual approach thereof said adjustable means including an adjustable projection on one finger to engage a fixed abutment and an adjustable projection on the other finger to engage the one finger.

8. Apparatus of the class described comprising tube filling means, continuous tube advancing means, and tube cross sealing means, the last-named means comprising a pair of relatively movable sealers, a fixed support for one sealer and a movable support for the other sealer, means to move the movable sealer into and out of tube sealing relation, means moving the sealers along with the tube during the sealing operation with the sealers in sealing relation and in the opposite direction with the sealers relatively retracted out of sealing relation, means controlling the volume of content of the tube in the area between a preceding cross seal and the position of the subsequent cross seal, said volume controlling means comprising a pair of relatively movable fingers effective to press the tube and express excess material from the tube at said area, and means on the supports to move the fingers relatively toward each other just prior to the cross sealing action means to space the fingers, and means to move one of the fingers to abut the fixed support.

9. Apparatus of the class described comprising a reciprocatory head, means advancing a filled tube therepast, the head moving with the tube and oppositely thereto in its reciprocatory travel, a pair of yieldingly tube engaging fingers on the head, one finger at each side of the tube, means to bring the fingers relatively toward each other in timed relation to the head motion during the stroke of the latter with the tube, adjustable means to effect predetermined positioning of the fingers relative to the tube, means relatively retracting the fingers on the stroke of the head opposite the tube direction of travel, sealing means for the tube, means to actuate said sealing means just subsequent to the mutual approach of the fingers, means maintaining the sealing means in sealing relation for an interval, and means maintaining the fingers in tube contacting relation for a longer interval.

10. Apparatus of the class described comprising means advancing a filled tube of heat sealable material, a reciprocatory member, means to reciprocate said member along the line of the path of the tube, a head on the member, means to reciprocate the head transversely of the path of the tube, a relatively fixed cross sealer on the member, a cooperating sealer fixed to the head, a tube volume controlling finger slidable on the member, resilient means tending to project the finger toward the tube, a second tube volume controlling finger movable on the head, adjustable stop means on the latter finger engaging the former finger and pressing the same away from the tube, adjustable stop means on the second finger, and means to move the head toward and away from the tube to cause mutual approach of the fingers and cross sealers.

11. The apparatus of claim 10 including resilient means tending to project the second tube control finger toward the first-named finger in advance of the sealer on the head.

12. Apparatus of the class described comprising means advancing a filled tube of heat sealable material, a reciprocatory head, means to reciprocate said head along the line of the path of the tube, a member on the head, means to reciprocate the member transversely of the path of the tube, a relatively fixed cross sealer on the head, a cooperating sealer fixed to the member, a tube volume controlling finger slidable on the member, resilient means tending to project the finger toward the tube, a second tube volume controlling finger movable on the head, adjustable stop means on the first finger engaging the second finger and pressing the same away from the tube, adjustable stop means on the second finger, and means to move the member toward and away from the tube to cause mutual approach of the fingers and cross sealers.

13. Apparatus of the class described comprising a head, means to reciprocate the head along the path of an advancing strip of sealable material, a member on the head, means to reciprocate the member thereon transversely to the direction of reciprocation of the head and to the path, a sealing element on the head, a cooperating sealing element on the member, a volume control finger slidable on the member, means projecting the finger toward the path, a second volume control finger movable on the head, said fingers in effect reciprocating toward and away from each other and lying at opposite sides of the path, means spacing the fingers at the point of closest approach thereof, and means to move the member toward and from the path to cause mutual aproach of the fingers and sealers.

14. The apparatus of claim 13 including means timing the volume control fingers to approach each other just prior to the sealing relation of the sealing elements and to maintain this relation until after the start of the mutual retraction of the sealing elements.

References Cited in the file of this patent

UNITED STATES PATENTS

| Number | Name | Date |
|---|---|---|
| 689,474 | Fales | Dec. 24, 1901 |
| 1,352,221 | Reifsnyder | Sept. 7, 1920 |
| 1,851,060 | Poppe | Mar. 29, 1932 |
| 1,886,047 | Ritscher | Nov. 1, 1932 |
| 1,986,422 | Zwoyer | Jan. 1, 1935 |
| 2,113,658 | Lakso | Apr. 12, 1938 |
| 2,166,643 | Salfisberg | July 18, 1939 |
| 2,265,253 | Smith | Dec. 9, 1941 |
| 2,351,713 | Sayre | June 20, 1944 |
| 2,420,983 | Salfisberg | May 20, 1947 |
| 2,508,197 | Singer | May 16, 1950 |
| 2,509,783 | Richardson | May 30, 1950 |

FOREIGN PATENTS

| Number | Country | Date |
|---|---|---|
| 331,527 | Great Britain | July 2, 1930 |